(12) United States Patent
Dietrich, Sr.

(10) Patent No.: US 9,226,437 B2
(45) Date of Patent: Jan. 5, 2016

(54) FERTILIZER APPLICATOR WITH COULTER FOR MINIMUM SOIL DISPLACEMENT

(71) Applicant: William J. Dietrich, Sr., Goodfield, IL (US)

(72) Inventor: William J. Dietrich, Sr., Goodfield, IL (US)

(*) Notice: Subject to any disclaimer, the term of this patent is extended or adjusted under 35 U.S.C. 154(b) by 0 days.

(21) Appl. No.: 14/556,894

(22) Filed: Dec. 1, 2014

(65) Prior Publication Data

US 2015/0150184 A1    Jun. 4, 2015

Related U.S. Application Data

(62) Division of application No. 13/790,949, filed on Mar. 8, 2013.

(60) Provisional application No. 61/609,037, filed on Mar. 9, 2012.

(51) Int. Cl.
| | |
|---|---|
| *A01C 23/00* | (2006.01) |
| *A01B 49/06* | (2006.01) |
| *A01C 5/06* | (2006.01) |
| *A01C 23/02* | (2006.01) |
| *A01C 21/00* | (2006.01) |

(52) U.S. Cl.
CPC ............ *A01B 49/06* (2013.01); *A01C 5/064* (2013.01); *A01C 21/002* (2013.01); *A01C 23/022* (2013.01); *A01C 23/023* (2013.01); *A01C 23/025* (2013.01)

(58) Field of Classification Search
USPC .................................. 111/118–122
See application file for complete search history.

(56) References Cited

U.S. PATENT DOCUMENTS

| | | | |
|---|---|---|---|
| 3,504,646 A | | 4/1970 | Trahms |
| 3,799,079 A | | 3/1974 | Dietrich |
| 4,289,081 A | | 9/1981 | Koronka |
| 4,407,371 A | * | 10/1983 | Hohl .............................. 172/253 |
| 4,574,715 A | | 3/1986 | Dietrich, Sr. et al. |
| 4,592,294 A | | 6/1986 | Dietrich, Sr. et al. |
| 4,596,199 A | | 6/1986 | Dietrich, Sr. et al. |
| 4,723,495 A | | 2/1988 | Dietrich, Sr. et al. |
| 4,762,075 A | * | 8/1988 | Halford .......................... 111/73 |
| 4,865,132 A | | 9/1989 | Moore Jr. |
| 5,495,897 A | * | 3/1996 | Javerlhac ....................... 172/604 |
| 5,862,763 A | | 1/1999 | Dietrich, Sr. |
| 5,865,131 A | | 2/1999 | Dietrich, Sr. et al. |
| 6,012,534 A | | 1/2000 | Kovach et al. |
| 6,095,065 A | | 8/2000 | Dietrich, Sr. |
| 6,102,132 A | * | 8/2000 | Schimke ....................... 172/498 |
| 6,178,900 B1 | | 1/2001 | Dietrich, Sr. |
| 6,397,767 B1 | | 6/2002 | Dietrich, Sr. |
| 6,973,884 B2 | | 12/2005 | Dietrich, Sr. |
| 7,575,066 B2 | | 8/2009 | Bauer |

* cited by examiner

*Primary Examiner* — Alicia Torres
(74) *Attorney, Agent, or Firm* — Greer, Burns & Crain, Ltd.

(57) ABSTRACT

An applicator for applying dry fertilizer or livestock waste in the form of a slurry beneath the soil surface with minimum soil displacement includes a leading spring-cushioned, conical-shaped, wavy coulter angularly offset from the direction of travel which displaces soil laterally in forming a furrow adapted to receive fertilizer. The coulter is trailed by a single, or a pair of, rotary blade(s) which fill the furrow created by the conical-shaped, wavy coulter, covering the deposited fertilizer. A second embodiment includes a second wavy coulter disposed between the leading coulter and the trailing rotary blades for directing soil in a laterally opposed direction from the soil displaced by the leading coulter in forming a wider furrow. The single conical coulter and dual conical coulter embodiments are interchangeable in the applicator, and can be removed and replaced with a curved shank and sweep assembly to convert to sweep fertilizer application.

11 Claims, 5 Drawing Sheets

FERTILIZER APPLICATOR WITH COULTER FOR MINIMUM SOIL DISPLACEMENT

CROSS REFERENCE TO RELATED APPLICATION

This application claims priority under 35 U.S.C. §119 from U.S. patent application Ser. No. 13/790,949, filed Mar. 8, 2013 and prior provisional application No. 61/609,037, filed on Mar. 9, 2012, and herein incorporated by reference.

FIELD OF THE INVENTION

The present invention relates to agricultural fertilizer applicators; and more particularly, it relates to apparatus for subsoil application of dry fertilizer or livestock waste in the form of slurry (that is, a freely flowable mixture of liquids and solids).

BACKGROUND OF THE INVENTION

Historically, livestock waste, particularly in solid form, has been spread on the surface of the soil by a manure spreader using a flail to fling the material to the rear. A more modern side-discharge spreader also deposits the material on the surface of the soil.

The advent of confinement systems for animals which include pits below the confinement area produces a large amount of animal waste in a slurry form which must be handled and disposed of. Typically, the slurry is pumped in a large tank carried by a wagon, but originally it was for the most part, spread or sprayed on the surface of the soil.

This procedure has, as a principal objection, a strong odor which remains after the waste is spread. Moreover, surface spreading of animal waste is not desirable with the potential runoff of nitrates and phosphorus into rivers and streams. This is objectionable because livestock waste is high in nitrogen, and swine waste is also high in phosphorus and with increasing concern with the quality of drinking water, this procedure is becoming less and less acceptable.

Various methods have been proposed for depositing the slurry underground. One method is to use a fertilizer knife, such as shown in U.S. Pat. No. 4,592,294 and to weld a large pipe to the rear of the knife to deliver the slurry behind the knife and into the slot cut in the soil by the knife. This leaves a very narrow band of fertilizer having a high concentration of nitrogen and other nutrients.

Another method of subsoil delivery of animal waste employs a standard chisel plow shank with an attached wide cultivator sweep, in an attempt to distribute the slurry further laterally and to avoid the concentration which occurs in the case of a simple fertilizer knife, described above.

This method, however, presents still another problem—namely, the cultivator sweep unnecessarily tills the soil and may result in burying surface residue. This may be a separate problem, particularly for farmers whose land may have been designated HEL, because there are federal requirements to maintain a certain percentage of crop residue on the surface of such soil. Both the chisel plow shank (which is a wide shank) and cultivator sweeps are designed to create a plowing action that mixes the soil with the residue, buries a large percentage of the residue, and leaves a furrow of exposed liquid behind the shank.

A more recent improvement is disclosed in U.S. Pat. No. 5,865,131. This device uses a spring-cushioned coulter running ahead of the applicator for cutting an initial slot in the residue and providing a break line in the soil to be parted by a trailing shank. The shank spreads the initial slot and deepens it. The shank includes a shoe provided with a pair of wings extended laterally. The shoe is in the form of a tillage point which fractures and lifts the soil in front of the shank. The wings lift the soil laterally of the shank from the center toward the outward ends of the wings to provide slots for promoting lateral distribution of the slurry.

The applicator of the '131 patent is suitable for delivering higher application rates of slurry, in the range of 9,000 to 10,000 or more gallons per acre. However, the ground speed of the '131 patent is limited to a range of 3-5 miles per hour. At these slower speeds, the soil is lifted sufficient to form lateral fissures in the soil at a depth of approximately 5 to 6 inches which permits the slurry to flow laterally of the applicator shank. Any greater speed would cause too much soil disruption, lifting and redistribution (i.e. tillage) due to the use of a forward portion of the shoe which acts like a plow point, having a surface which is inclined upwardly and rearwardly for fracturing and lifting the soil in front of the shank. Another recent improvement is disclosed in U.S. Pat. No. 6,973,884.

The rotary liquid slurry injector of the present invention requires less horsepower and results in a much more desirable flow of heavy residue. It provides excellent residue flow for 24 hour operation, including dew-soaked residue.

SUMMARY OF THE INVENTION

The present invention is designed to operate in a wide variety of soil types and heavy residue. The present invention employs two (2) conical shaped wavy blades to provide openings side-by-side. The front coulter creates a slot and moves soil laterally. A second rear blade is mounted to move soil laterally in the opposite direction. The loosened soil between the two (2) paths is fractured to allow liquid to fill in the voids. One conical wavy blade system could provide an alternate embodiment. This would reduce maximum gallons per acre and create more concentration of nutrients. A slurry delivery tube is mounted to the rear coulter hub support arm. Adjustment is provided so that the front coulter can be operated at the same depth as the rear coulter or operated shallower if desired. In hard soil it is often desirable to run the rear coulter deeper since less down pressure is often required because the front coulter has loosened an adjacent soil path. This coulter application has limitations regarding gallons per acre. Depending on soil moisture, a range of 3000-9000 gallons per acre is fairly realistic using the present invention. The shank that the rear coulter and the closer blades are mounted to can be removed by removing one (1) bolt and loosening two (2) others. A curved shank, as shown in U.S. Pat. No. 6,973,884, may be installed in a forward assembly for sweep application. The high gallon per acre sweep can accommodate a 20,000 gallon application rate, thus providing a very wide range of application.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
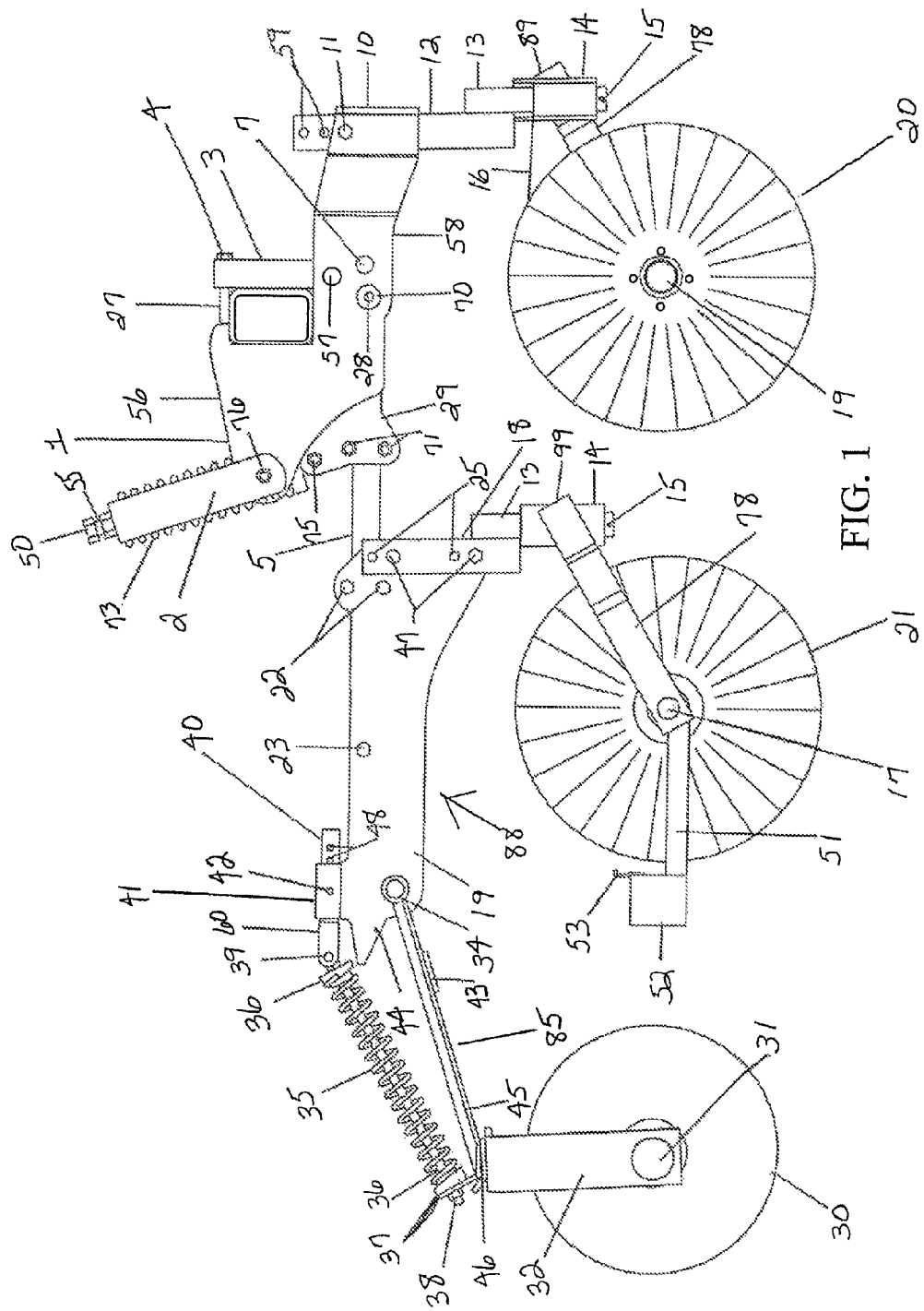
FIG. 1 is a right side elevation view of a rotary applicator for depositing slurry fertilizer in accordance with the present invention.

Referring to FIG. 1, there is shown a right side elevation view of the overall rotary applicator unit for spreading dry fertilizer or livestock waste in the form of a slurry. Reference number 1 generally designates a spring reset mechanism for a single row unit of a slurry applicator. As is known, a number of such applicator units are mounted on a wagon with a tool bar 27 drawn by a tractor (not shown). The applicator units are mounted in side-by-side relation and in a spaced manner. The tool bar 27, or frame, may have its own support wheels, or may be mounted to a wagon carrying the slurry. In any case, tool bar 27 trails a slurry wagon, or container, (also not shown for convenience) for a large amount of slurry fertilizer which is to be applied to a field. A coiled spring 73 is compressed (i.e. preloaded) and pivotally connected to a main shank 5 by bolt 55. When a rock or other obstruction is encountered by the rear conical coulter blade 21, the main shank 5, the rear conical coulter blade 21, and slurry tube 52 are pivoted upwardly away from the obstruction. As the coiled spring 73 is compressed, bolt 55 telescopes and pivots at mounting bolt 75 out of a trunion 2. Main shank 5 pivots at pin 7. Opening 70 allows a front shank bolt 28 to be inserted in a shank clamp weldment 29. Shank clamp weldment 29 pivots about pivot pin 7.

The spring cushion/reset mechanism 1 is mounted to a conventional toolbar 27 by mounting plates 56 and a mounting bracket 3 that pivots on a bolt 57. With an upper bolt 4 inserted through mounting bracket 3, mounting plates are tightly clamped against the toolbar 27 located between bracket 3 and the mount plates. At the forward portion of the mounting assembly, steel plates are formed inward. At the forward portion of the plates 58 is a cross piece of steel 10. A similar piece of steel is welded behind a front coulter mount bar 12. This provides a rectangular sleeve of receptacle so that the coulter mount bar 12 can be telescoped vertically within the sleeve and pinned (see pins 11) to adjust a front coulter 20 to the desired operating depth. Additional holes 59 are provided in coulter mount bar 12 to allow the front coulter 20 to be positioned at the same depth or shallower than the rear coulter 21.

On a lower forward portion of coulter mount bar 12 a vertical shaft 13 is welded and the forward portion of a spring-cushioned assembly 16 is provided with a sleeve 14 telescopically coupled to vertical shaft 13. A front coulter assembly 89 including front coulter blade 20 is similar to assemblies used on various agricultural tillage tools. Rear coulter assembly 85 and closer assembly 90 are bolted to a main shank 5 by means of a U-bolt and nuts 22 at the forward portion. Another bolt 23 attaches the rear portion of main shank 5 to an intermediate portion of the rear coulter assembly 85. Bolts 47 attach rear coulter mount bar 18 to the rear coulter assembly 85. A pair of coulter hub support arms 78 are coupled to rear coulter mounting bar 18 and support the rear coulter hub 17. Additional holes 25 in rear coulter mounting bar 18 provide an independent depth setting for units operating in tire tracks in wet conditions. Additional holes 59 in front coulter mount bar 12 allow the front coulter 20 to also be independently lowered in the tire tracks. Pin 13 and sleeve 14 also allow swivel of the front coulter 20 about a generally vertical axis. Also, rear coulter mount bar 18 may be shimmed between rear coulter 21 and the path of a closer mount plate 19 to change variation of the path of the front coulter 20 through the soil (vertically or left to right) versus the path of the rear coulter 21 through the soil.

A bar 51 supports a short pipe 52 which extends behind rear coulter blade 21. To facilitate delivery in the slots created by the coulters 20 and 21, a clip 53 provides support to clamp a slurry delivery hose behind rear coulter blade 21. A pair of furrow closing blades 30 are laterally spaced approximately 12" apart and operate at acute angles relative to the direction of travel thereby forming a berm of loose soil on the top of the slots formed by the front and rear coulter blades 20 and 21. Some liquid fertilizer soaks into the surface soil. The purpose of the furrow closing blades 30 is to cover this area to reduce odor and prevent liquid from flowing down slope on steep hills. To allow the furrow closing blades 30 to follow the soil contour, pin 34 allows frame weldment 45 to pivot vertically. Cross plate 43 limits movement when the frame weldment 45 contacts cross plate 43. Formed cross plate 43 has a slotted hole therein to allow for angular adjustment of the furrow closing blade 30 relative to the direction of travel similar to conventional closers.

A hub 31 is welded to support arms 32. A coiled spring 35 is disposed about and extends the length of bolt 38. A nut 37 disposed on bolt 38 limits downward movement of furrow closer assemblies 90 and furrow closing blades 30. Castings 36 are positioned on each end of spring 35 to fit the spring coil. A pivot bolt 39 is attached to a tab 60 that is welded to pin 40. Pin 40 telescopes through sleeve 41. Pin 40 has multiple holes and spring 35 compression can be changed by removing pin 42 and telescoping pin 40 forward or rearward through sleeve 41 to change the downward force exerted on furrow closing blades 30. Removal of the front shank bolt 28 and loosening bolts 71 respectively in mounting plates 56 and shank clamp weldment 29 allows the rear coulter assembly 85, a furrow closer assembly plate weldment 88 and main shank 5 to be removed as one (1) single assembly and be replaced with a formed shank and sweep to convert to sweep incorporation.

Figure 2:
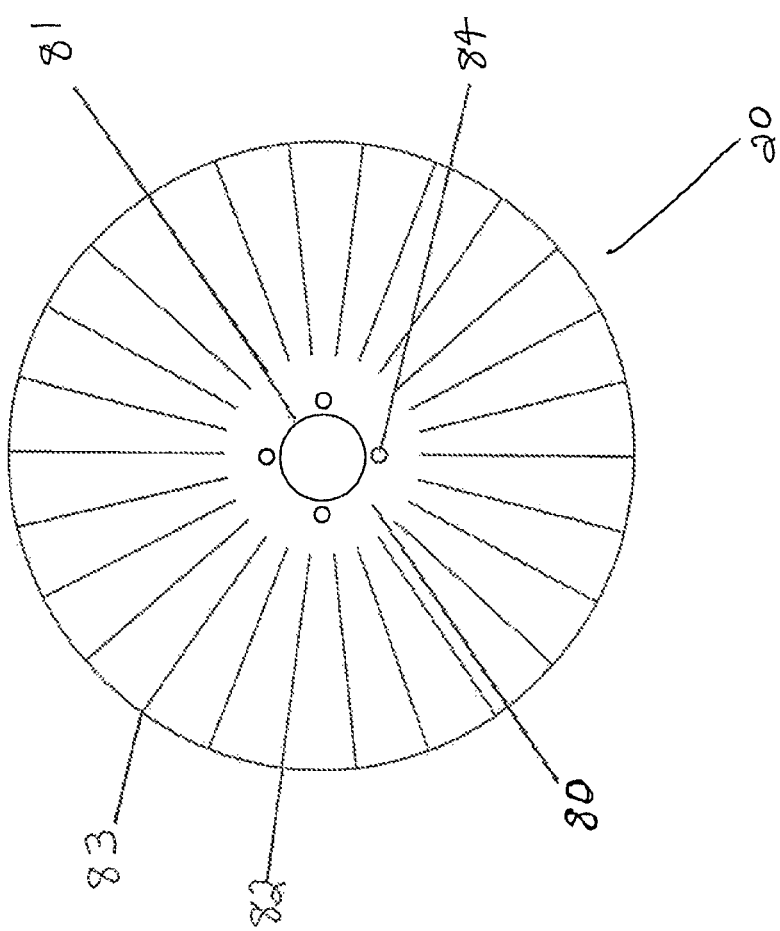
FIG. 2 is a side elevation view of a conical wavy coulter blade.

Referring to FIG. 2, there is shown a side elevation view of a wavy conical shaped coulter blade 20 with a flat center portion 80 contemplated for use in the present invention. Waves with crests 82 and valleys 83 are formed from a flat center to an outer periphery of the conical shaped coulter blade 20. A center hole 81 within the wavy conical coulter blade 20 is sized to fit over the blade's inner hub 17 for mounting the coulter blade 20 to the hub. For this purpose, there are provided four (4) bolt holes 84 as shown in FIG. 1.

Figure 3:
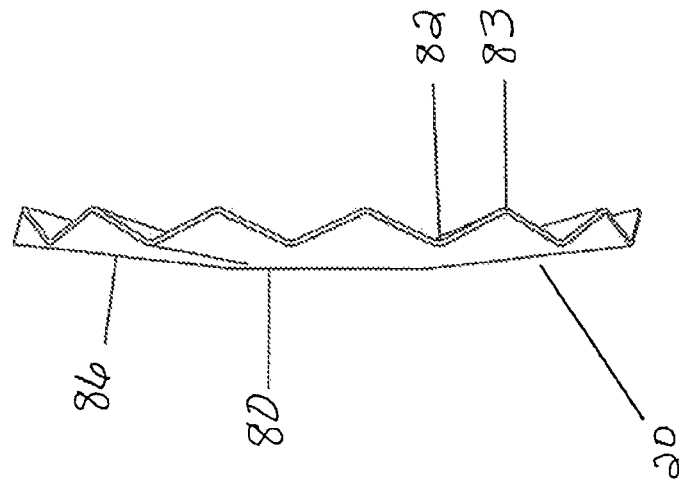
FIG. 3 is an edge-on view of the conical wavy coulter blade shown in FIG. 2.

Referring to FIG. 3, there is shown an edge-on view of the conical wavy coulter blade 20. As the leading edge of the conical shaped blade enters the soil, the coulter blade 20 swivels on sleeve 14 as shown in FIG. 1. The conical shape of coulter blade 20 is shown in its curvature 86. As the blade 20 rotates forward, its conical shape 86 enters the soil along the line of travel and soil is lifted and moved laterally providing a slot for the liquid fertilizer to flow down into. As any excess water in the slurry infiltrates the soil below the slot, the solids are buried at the bottom. This prevents high surface soil fertility.

Figure 4:
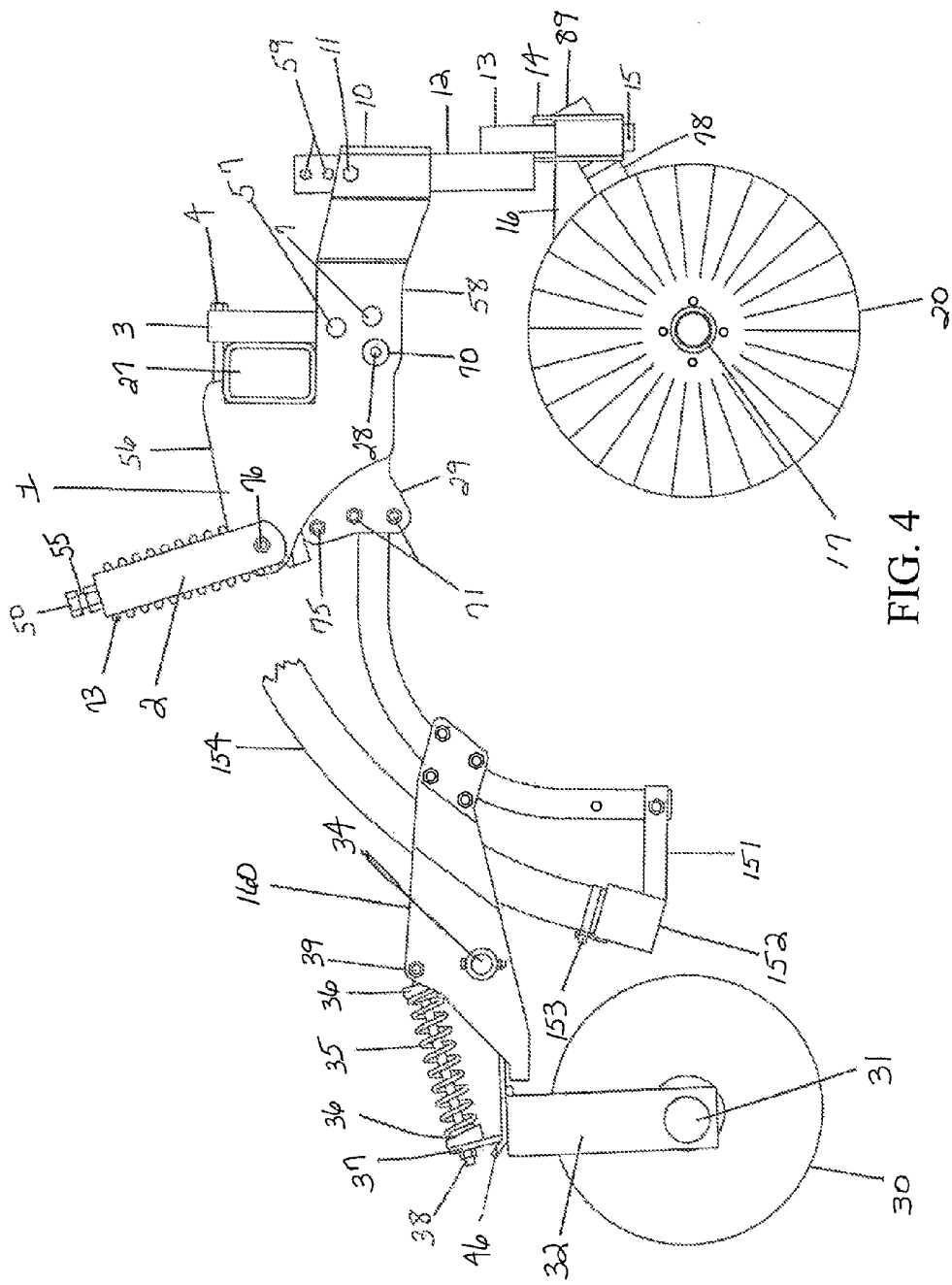
FIG. 4 is a right side elevation view of a rotary applicator for depositing slurry fertilizer, commercial liquid or dry fertilizer with a single conical blade in accordance with the present invention.
Figure 5:
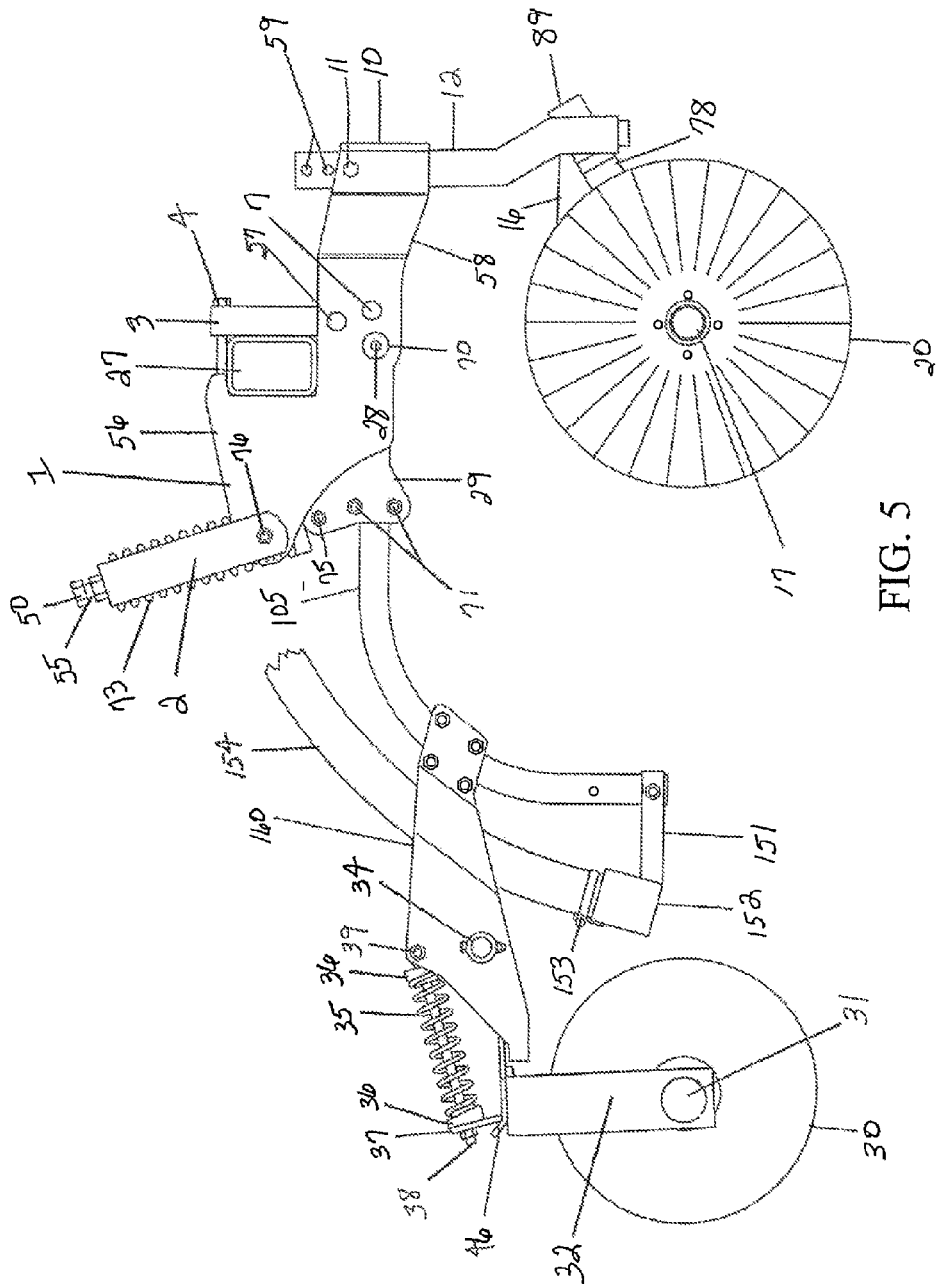
FIG. 5 is a right side elevation view of an alternate embodiment of the inventive rotary applicator for depositing slurry fertilizer with a single conical blade having a rigid, non-swivel mount.

FIGS. 4 and 5 illustrate additional embodiments of the invention respectively including pivotally mounted swiveling single blade and a non-pivoting, fixed single blade. FIG. 5 illustrates yet another embodiment of the present invention including the combination of a single blade and a shank and sweep arrangement with a delivery tube. Elements shown in FIGS. 4, 5 and 6 which are also illustrated in FIGS. 1, 2 and 3 and discussed above are provided with the same element members throughout all of the figures.

Referring to FIG. 4, depicts the single blade system. The rear blade is removed and a curved shank 105 is installed behind the front coulter blade 20. Bracket 151 is bolted to the aft, lower end of shank 105 and supports a short pipe 152 behind coulter 20. A clip 153 provides a support to clamp a slurry delivery hose 154 to pipe 152 aft of coulter 20. A pair of blades 30 are spaced approximately 12" apart and operate at an acute angle to the direction of travel thereby building a berm of loose soil on the top of the slot created by the coulter 20. Some liquid soaks into the surface soil. The purpose of the blades is to cover this area to reduce odor and prevent liquid from moving on steep hills. Formed cross plate 46 has slotted holes to allow blade 30 angle adjustment similar to conventional closers. Additional holes 59 in front coulter mount bar 12 allow the front coulter 20 to also be independently lowered to provide the same depth in the tire tracks where the surface of the soil is appreciably lower. This can occur in wet conditions because the tank tires will cut a slight rut.

With reference to blade 30, a single closing blade could be employed to move soil opposite the lateral direction of the soil moved by the conical wavy blade 20. However, it would reduce the amount of soil covering the furrow especially in adverse soil conditions as compared to the use of a pair of covering blades.

A hub 31 is welded to support arms 32. A spring 35 sleeves over bolt 38. A nut 37 on bolt 38 telescopes inside spring 35. A pivot bolt 39 attaches to mount 160 and clamps to shank 105 in an arrangement which applies a downward force on furrow closing blade 30.

Referring to FIG. 5, is shown a right side elevation of another embodiment of a rotary applicator for depositing the slurry fertilizer with a single conical blade 20 in accordance with the present invention incorporating a rigid, non-swivel mount. The hub, or spindle, 17 is fixed to arm 78. The portion of the conical blade 20 ahead of the spindle 17 enters the soil in line of travel direction and the rear portion moves soil laterally to provide a furrow. The disadvantage to the non-swivel assembly is that any time the tank unit is not going straight in line, the massive side forces are created and causes stress to the tank mount and the coulter assembly. The fixed mount is not a problem when attached to a tool bar that is pulled behind a farm tractor drawbar.

Figure 6:
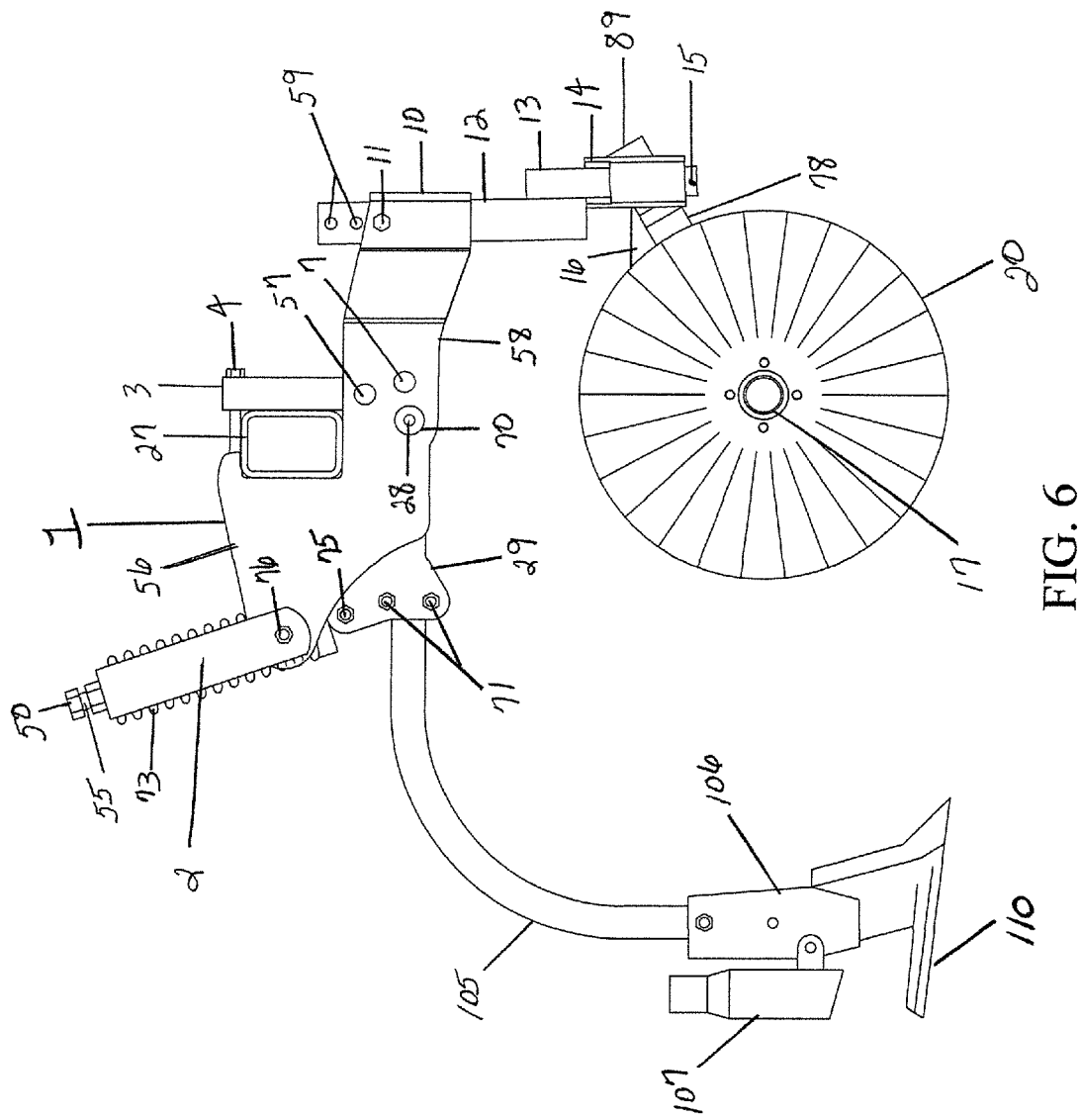
FIG. 6 is a right side elevation view of another embodiment of the inventive rotary applicator for depositing slurry fertilizer incorporating a sweep for applying more gallons per acre application.

Referring to FIG. 6, removal of the front shank bolt 70 and loosening bolts 71 allows the rear coulter assembly 99 and closer assembly 85 and plate weldment 88 and shank 5 to be removed as one (1) single assembly and be replaced with a formed shank 105 and sweep 106 with delivery tube 107 to convert to sweep incorporation as depicted in U.S. Pat. No. 6,973,884. Sweep 106 includes a pair of wings extending outwardly and substantially horizontally in opposite directions, where one of the wings is shown as element 110 in FIG. 6. These outwardly extending wings 110 form left and right lateral extensions of a lower portion of the furrow. This applicator is not limited to livestock waste. A single blade unit would be ideal for applying liquid or dry commercial fertilizer.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the claims when viewed in their proper perspective based on the prior art.

What is claimed:

1. An applicator attached to a support frame for depositing fertilizer beneath the soil surface with minimum soil displacement, said applicator comprising:
a spring-cushioned, conical-shaped coulter having a circular outer periphery and wavy first and second opposed lateral surfaces and pivotally attached to the support frame about an offset axis to allow said coulter to swivel relative to the direction of travel of the applicator, wherein a forward portion of said coulter is closely aligned with the direction of travel of the applicator and an aft portion of said coulter is angularly offset from the applicator's direction of travel and displaces the soil laterally relative to the applicator's direction of travel in forming a furrow in the soil;
a sweep shank attached to the support frame and extending rearwardly and downwardly and having first and second opposed ends, wherein said first end is attached to the support frame and said second end is disposed adjacent the soil surface and is aligned with said coulter along a direction of travel of the support frame;
a sweep attached to the second end of said sweep shank and disposed aft of said coulter in said furrow, said sweep having left and right side wings extending substantially horizontally for respectively forming left and right lateral extensions in a lower portion of the furrow; and
a delivery tube attached to said sweep shank and disposed aft of said sweep for depositing fertilizer in the furrow.

2. The fertilizer applicator of claim 1 further comprising a first spring-cushioned assembly coupling a forward portion of said sweep shank to said support frame for allowing said sweep to move upwardly upon impact of said sweep with an obstruction in the soil.

3. The fertilizer applicator of claim 1 further comprising a second spring-cushioned assembly coupling said coulter to said support frame for urging said coulter downward into engagement with the soil, while allowing said coulter to deflect upward upon impact with an obstruction in the soil.

4. The fertilizer applicator of claim 1 further comprising first adjustable means coupling said coulter to said support frame for allowing the running depth of said coulter in the soil to be adjusted upward or downward, as desired.

5. The fertilizer applicator of claim 1 further comprising a first forward bolt coupling a forward end of said sweep shank to an intermediate portion of said support frame, and second and third bolts respectively coupling an intermediate portion of said sweep shank to an aft portion of said support frame, wherein removal of said first bolt and loosening of said second and third bolts allows for removal of said sweep shank from the support frame.

6. The fertilizer applicator of claim 1, wherein said coulter has a conical shape and includes a flat center hub portion and plural alternating crests and valleys extending from said flat center hub portion to the outer periphery of said coulter.

7. The fertilizer applicator of claim 1 further comprising a mounting arrangement for securely attaching said support frame to the tool bar of an agricultural implement.

8. The fertilizer applicator of claim 1, wherein the fertilizer is in liquid or dry form.

9. The applicator of claim 1, wherein said sweep shank is curvilinear and pivotally coupled to an aft portion of said support frame to allow said sweep to move vertically relative to said support frame.

10. The applicator of claim 1, wherein a first portion of said support frame includes resilient biasing means for urging said coulter downward in engagement with the soil.

11. An applicator attached to a support frame for depositing fertilizer beneath the soil surface with minimum soil displacement, said applicator comprising:

- a spring-cushioned, conical-shaped rotary blade having a circular outer periphery and wavy first and second opposed lateral surfaces pivotally attached to the support frame about an offset axis to allow said rotary blade to swivel relative to the direction of travel of the applicator wherein a forward portion of said rotary blade is closely aligned with the direction of travel of the applicator and an aft portion of said rotary blade is angularly offset from the applicator's direction of travel so as to displace soil laterally relative to the applicator's direction of travel in forming a furrow in the soil;
- a shank attached to the support frame and extending rearwardly and downwardly and having first and second opposed ends, wherein said first end is attached to the support frame and said second end is disposed adjacent the soil and is aligned with, and disposed aft of, said rotary blade along a direction of travel of the support frame; and
- a delivery tube, or the combination of a delivery tube and a sweep, attached to the second end of the said shank for depositing fertilizer in the furrow.

* * * * *